United States Patent [19]

Ide et al.

[11] Patent Number: 4,581,655
[45] Date of Patent: Apr. 8, 1986

[54] VIDEO DISPLAY APPARATUS

[75] Inventors: Katsuyuki Ide; Mitsuhiro Hamaguchi, both of Yokohama; Nobuo Shibano, Tokyo, all of Japan

[73] Assignee: Toshiba Denzai Kabushiki Kaisha, Tokyo, Japan

[21] Appl. No.: 595,532

[22] Filed: Mar. 30, 1984

[30] Foreign Application Priority Data

Mar. 31, 1983 [JP] Japan .................................. 58-55637

[51] Int. Cl.⁴ .......................... H04N 5/68; H04N 3/14; H04N 5/14
[52] U.S. Cl. .................................. 358/242; 358/241; 358/163
[58] Field of Search ........................ 358/242, 241, 163

[56] References Cited

U.S. PATENT DOCUMENTS 3,838,209  9/1974  Tsuchiya et al. ................... 358/241
4,210,934  7/1980  Kutaragi ............................. 358/241
4,343,021  8/1982  Frame ............................. 358/163 X Primary Examiner—Michael A. Masinick
Assistant Examiner—E. Anne Toth
Attorney, Agent, or Firm—Schwartz, Jeffery, Schwaab, Mack, Blumenthal & Evans

[57] ABSTRACT

In a picture image display apparatus including a large number of display elements which are lighted by digitalized level adjusted light data produced by a video signal, the digitalized level adjusted light data are corrected by the difference between a mean quantity of light and the light quantity of each luminous element so as to light the luminous element during an interval corresponding to the level adjusted light data without using any light quantity adjusting circuit.

4 Claims, 4 Drawing Figures

VIDEO DISPLAY APPARATUS

BACKGROUND OF THE INVENTION

This invention relates to a video display apparatus in which a large number of luminous elements of the number equal to that of picture elements are arrayed in a plane for displaying a television image, a picture or letters are lighted in accordance with digitalized level adjusted light data, that is brightness data.

In such apparatus, the level of a light or image signal supplied to each display element is adjusted in many steps for example 64, and the interval of the light signal supplied to the luminous element is varied in accordance with the adjusted level, thus controlling the light quantity emitted by the luminous element.

A large scale image display apparatus installed on the outdoor, for example, a baseball ground, comprises several tens of thousands or more luminous elements. However, it is difficult to manufacture such large numbers of luminous elements to have the same luminescent characteristic when they are energized by the same operating power, so that it has been the conventional practice to individually measure the luminescent characteristic of respective elements and to provide individual light quantity adjusting circuits for respective luminous elements. Due to an extremely large number of the luminous elements used, measurements of their characteristics and adjustments of the light quantity adjusting circuits are not only troublesome but also expensive, which in turn increases the cost and size of the image display apparatus.

SUMMARY OF THE INVENTION

It is an object of this invention to provide an improved large scale image display apparatus capable of equalizing the light quantities emitted by a large number of luminous elements comprising an image display plane for level adjusted data having equal value without using light quantity adjusting circuit, thereby displaying a picture image at a high fidelity corresponding to the level adjusted data.

According to this invention, there is provided video display apparatus comprising a display device including a plurality of luminous elements arranged to form a display plane; image signal generating means outputting digitalized level adjusted light data as image signals for respective luminous elements; a first memory device for storing the level adjusted light data of at least one picture displayed next time by the display device; a second memory device for storing values obtained by converting differences between a mean light quantity of respective luminous elements when they are supplied with a predetermined operating power and a light quantity of each luminous element into level differences of the level adjusted light data; an arithmetic operation circuit for correcting the level adjusted light data stored in the first memory device with data stored in the second memory device and then outputting corrected level adjusted light data; and display control means for lighting the luminous elements for intervals corresponding to the corrected level adjusted light data outputted from the arithmetic operation circuit.

DESCRIPTION OF THE PREFERRED EMBODIMENT

Figure 1:
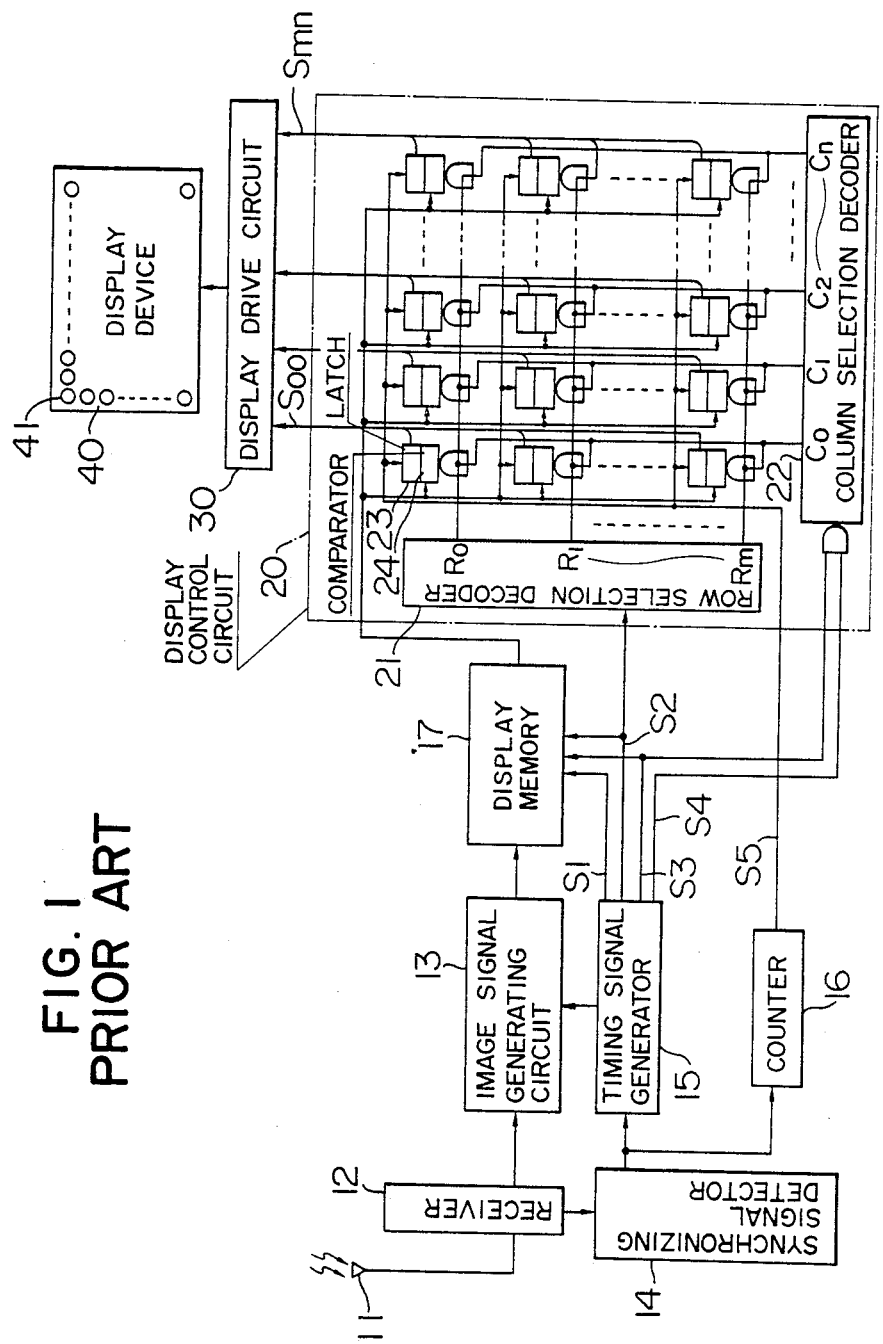
FIG. 1 is a block diagram showing a prior art video display apparatus.

To have better understanding of the invention, a typical prior art video display apparatus will firstly be described with reference to FIG. 1 which is constructed such that a television image signal received by an antenna 11 is applied to a video signal generating circuit 13 via a receiver 12 having amplifying and office selection performances. The video signal generating circuit 13 is constructed to convert an analog signal into a digital signal, and to judge whether the video signal belongs to which one of the levels of level adjusted light data of luminous elements displaying an image picture for producing digitalized level adjusted light data. For the purpose of precisely controlling the quantity of light emitted by each luminous element, the level of the light signal or data is adjusted in many steps as much as 64, and the quantity of light emitted by the luminous element is controlled by controlling the interval of light emission according to the level of the light data. A synchronizing signal detector 14 is connected to the receiver 12 so as to cause a timing signal generator 13 to generate a write/read signal S1, a row selection address signal S2, a column selection address signal S3 and a latch signal S5 in accordance with the output of the synchronizing signal detector 14. Furthermore, in response to the output signal of the synchronizing signal detector 14, a counter 16 is cleared each time an interval corresponding to one scene of the image elapses. Also, the counter 16 outputs a level adjusted light data S5 whose level is sequentially incremented by one in this interval to a value corresponding to the number of levels.

On the output side of the video signal generator 13 is provided a display memory device 17 which stores the level adjusted light data of one picture in accordance with the write/read signal S1, and address signals S2 and S3. When the level adjusted light data corresponding to just one picture have been stored in the display memory device 17, the data are read out and supplied to a display control circuit 20.

The display control circuit 20 comprises a row selection decoder 21 actuated by address signal S2, a column selection decoder 22 actuated by address signal S3 and latch signal S4, latch circuits 23 and comparators 24 which are disposed in a matrix circuit and provided for respective luminous elements. Each latch circuit 23 stores the level adjusted light data for each luminous element read out from the display memory device 17 and outputs display signals $S_{oo}$-$S_{mn}$ when the value of the level adjusted light data stored in the latch circuit is larger than that of the level adjusted light data S5.

Display signals $S_{oo}$-$S_{mn}$ are applied to a display drive circuit 30 including switching elements, for example transistors, the display drive circuit 30 lighting luminous elements 41 forming a picture plane of a display device 40. Each luminous element 41 is lighted for an interval corresponding to the level of the level adjusted light data thus displaying a picture on the display device 40 corresponding to image signals.

While the level adjusted light data of the display memory device are stored in the latch circuits 23 of the display control circuit 20, the level adjusted light data of one picture corresponding to the next scene are written into the display device 17, and the operations described above are repeated.

As the luminous elements 41 are generally used luminous diodes, a cathode ray tube, incandescent lamps or the like, and these luminous elements which are arranged in a matrix circuit are required to have substantially the same luminescent characteristic.

For this reason, luminous elements having substantially the same luminescent characteristic have been selected or light quantity adjusting circuits have been provided for respective luminous elements. In a large capacity display device utilizing several tens of thousands or more luminous elements, it is extremely difficult to select luminous elements having the same or substantially the same luminescent characteristic, so that it has been difficult to make equal the light quantities of respective luminous elements unless providing light quantity adjusting circuits for respective luminous elements.

In practice, however, it is extremely troublesome and expensive to provide light quantity adjusting circuits for a large number of luminous elements. The video display device shown in FIG. 1 is not provided with the light quantity adjusting circuits so that it cannot display at a high fidelity a picture image corresponding to its level adjusted light data.

As above described it is the object of this invention to provide an improved video display apparatus capable of displaying a picture image at a high fidelity without utilizing light quantity adjusting circuits for numerous luminous elements.

Figure 2:
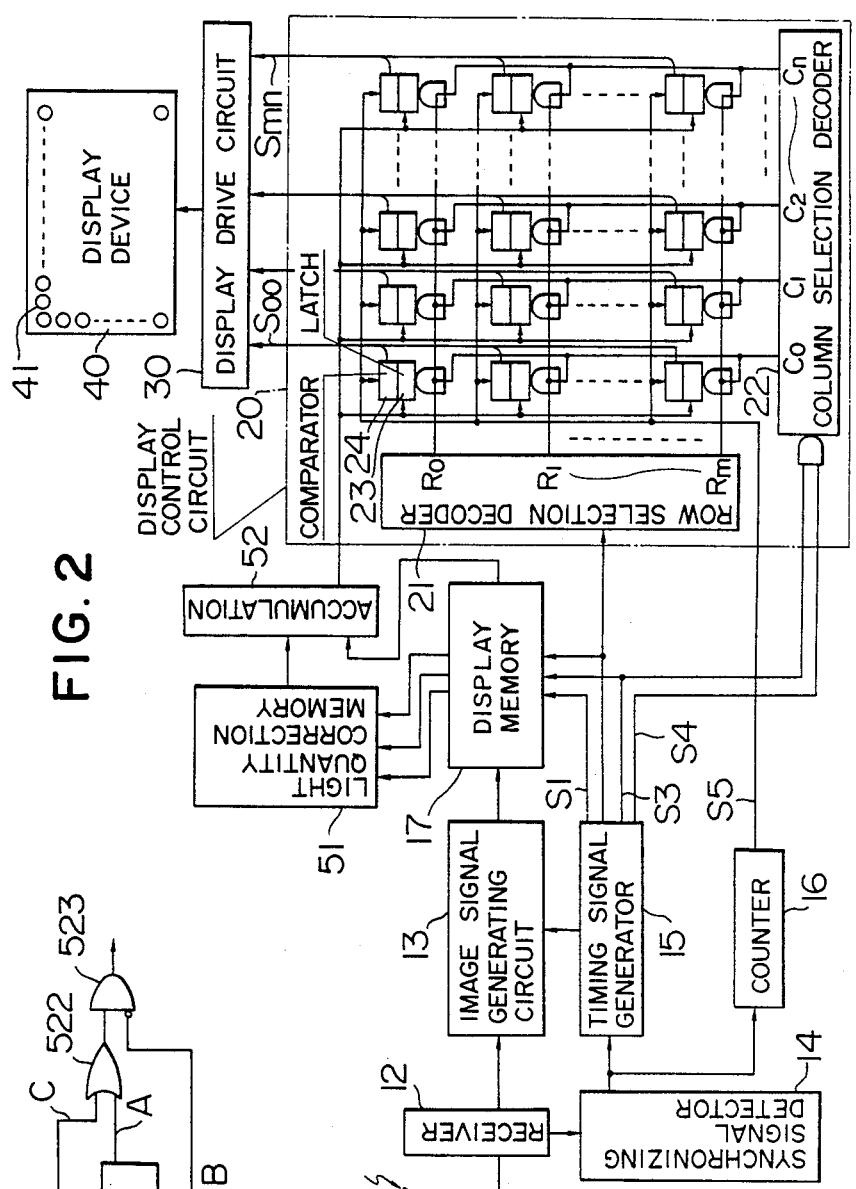
FIG. 2 is a block diagram showing a preferred embodiment of this invention.

FIG. 2 shows a preferred embodiment of this invention in which the same or corresponding elements shown in FIG. 1 are designated by the same reference characters. According to this invention, there are provided a light quantity correction memory device 51 which stores values obtained by converting the difference between a mean light quantity of respective luminous elements 41 supplied with a predetermined electric power necessary to emit reference light quantity and a light quantity of each luminous element into the level difference of the level adjusted light data to store the level difference, and an accumulator 52 which subtracts or adds data read out from the display memory device 17 and the light quantity correction memory device 51 for supplying the result of addition or subtraction operation to the accumulator 52.

Figure 3:
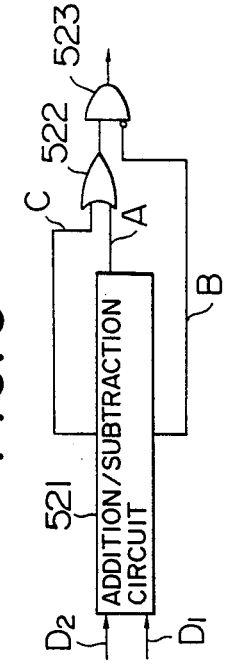
FIG. 3 is a block diagram showing the detail of an accumulator utilized in the embodiment shown in FIG. 2.

FIG. 3 is a connection diagram showing the detail of the accumulator 52 comprising an addition/subtraction circuit 521 which adds or subtracts each other level adjusted light data D1 and light quantity adjusting data D2 respectively read out from the display memory device 17 and the light quantity correction memory device 51, an OR gate circuit 522 inputted with an output A, and a shift up signal C from the addition/subtraction circuit 521, and an AND gate circuit 523 inputted with a signal obtained by inverting the shift down signal B from the addition/subtraction circuit 521 and the output of OR gate circuit 522.

The operation of the video display apparatus, especially that of the elements newly added will now be described.

The level adjusted light data corresponding to one picture displayed by the display device 40 are stored in the display memory device 17 as positive values, while positive or negative values of level adjusted light data obtained by converting the difference between the light quantities emitted by each luminous elements and mean light quantity of respective luminous elements when they are supplied with the predetermined operating power are stored in the light quantity correction memory device 51. In this case, light quantities larger than the mean light value are expressed as negative values, while those smaller than the mean light value as positive values.

In synchronism with read out of the level adjusted light data D1 from the display memory device 17, the light quantity correction data D2 are read out from the light quantity correction memory device 51. When the light quantity correction data D2 are negative the addition/subtraction circuit 521 executes an operation of D1−D2, whereas when the data D2 are positive, the addition/subtraction circuit executes an operation of D1+D2. When a shift up becomes necessary as a result of these arithmetic operations, that is at the time of an operation D1+D2, the shift up signal C is inputted to the OR gate circuit 522 so as to change to "1" all bits of the output thereof. On the contrary, when it becomes necessary to effect a shift down, that is in the case of an operation D1−D2, the shift down signal B is inputted to the AND gate circuit 523 to change to "0" all bits of the output thereof. Further, the addition/subtraction circuit 521 produces a signal A representing the result of addition or subtraction.

Accordingly, luminous elements whose light quantities are less than the mean value are lighted for longer interval for the same applied power and vice versa, whereby it is possible to make uniform the light quantities emitted by respective luminous elements for the same level adjusted light data.

Although in the foregoing description the video display apparatus of this invention was used to display a television picture image, it will be clear that it can also display the video image reproduced from a video tape recorder or any other image signal generating device capable of generating light data whose levels are adjusted stepwisely.

Figure 4:
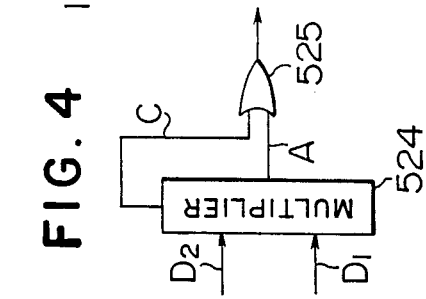
FIG. 4 is a block diagram showing modified accumulator.

As shown in FIG. 4, the multiplier can be constituted by a multiplier 524. In this case a multiplying constant of less than 1 is inputted as correction data D2 but a multiplying constant of larger that 1 is inputted as the correction data. In such case since there is no shift down only shift up signal C is produced so that only an OR gate circuit 528 is provided to calculate the logic sum of signals C and A.

As above described, according to this invention it is possible to make uniform the light quantities emitted by a plurality of luminous elements comprising a video picture for level adjusted light data having an equal value without using light quantity adjusting circuits for respective luminous elements.

We claim:

1. Video display apparatus comprising:
a display device including a plurality of luminous elements arranged to form a display surface;
image signal generating means outputting digitalized level adjusted light data as image signals for respective luminous elements;

a first memory device for storing said level adjusted light data of at least one picture displayed in a subsequent time period by said display device;

a second memory device for storing values obtained by converting differences between a mean light quantity of respective luminous elements when they are supplied with a predetermined operating power and a light quantity of each luminous element into level differences of said level adjusted light data;

an arithmetic operation circuit for correcting the level adjusted light data stored in said first memory device with data stored in said second memory device and then outputting corrected level adjusted light data;

display control means for lighting said luminous elements for intervals corresponding to said corrected level adjusted light data outputted from said arithmetic operation circuit.

2. The video display apparatus according to claim 1 wherein said signal generating means produces said digitalized level adjusted light data from a video signal received by an antenna or reproduced from a video tape recorder.

3. The video display apparatus according to claim 1 wherein said arithmetic operation circuit comprises an addition/subtraction circuit supplied with a level adjusted light data read out from said first memory device and light quantity correction data read out from said second memory device for producing a shift up signal, a shift down signal and a signal representing result of addition or subtraction, an OR gate circuit inputted with said shift up signal and said signal representing result of addition or subtraction, and an AND gate circuit inputted with an output of said OR gate circuit and a signal produced by inverting said shift down signal.

4. The video display apparatus according to claim 1 wherein said arithmetic operation circuit comprises a multiplier supplied with a multiplying constant of less than one or larger than 1 as light quantity correction data from said second memory device and said level adjusted light data read out from said first memory device so as to produce a shift up signal and a signal representing result of multiplication, and an OR gate circuit inputted with said shift up signal and said signal representing result of multiplication.

* * * * *